(12) United States Patent
Vajo et al.

(10) Patent No.: US 7,938,254 B1
(45) Date of Patent: May 10, 2011

(54) HYDROGEN PERMEABLE ENCAPSULATED SOLID-STATE HYDRIDE MATERIALS AND METHOD FOR FORMING AND USING SAME

(75) Inventors: John J. Vajo, West Hills, CA (US); Tina T. Salguero, Encino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1086 days.

(21) Appl. No.: 11/688,054

(22) Filed: Mar. 19, 2007

(51) Int. Cl.
*B65D 85/00* (2006.01)
*C01B 3/04* (2006.01)

(52) U.S. Cl. .................... 206/0.7; 423/648.1; 423/658.2
(58) Field of Classification Search .................... 206/0.7
See application file for complete search history.

(56) References Cited

U.S. PATENT DOCUMENTS

| | | | | |
|---|---|---|---|---|
| 4,133,426 A | * | 1/1979 | Turillon et al. | 206/0.7 |
| 4,134,491 A | * | 1/1979 | Turillon et al. | 206/0.7 |
| 4,310,601 A | * | 1/1982 | Bernauer et al. | 428/566 |
| 2007/0124989 A1 | * | 6/2007 | Eickhoff et al. | 44/301 |

FOREIGN PATENT DOCUMENTS

DE 137061 * 8/1979
* cited by examiner

*Primary Examiner* — Wayne Langel
(74) *Attorney, Agent, or Firm* — Christie, Parker, Hale

(57) ABSTRACT

A capsule having a hydrogen gas permeable shell with solid-state hydride material, such as hydrogen rich $LiAlH_4$, $Li_3AlH_6$, and/or $AlH_3$ encapsulated therein. The hydrogen gas permeable shell has pores that are between about 1 nm to about 150 μm in diameter to allow hydrogen gas to be extracted from the capsule. After passing the capsule through a hydrogen extraction zone, the capsule containing the spent solid-state hydride material is removed and is sent to recycling, wherein the capsule is opened to remove the spent solid-state hydride material, and the spent solid-state hydride material is rehydrogenated and repacked in a hydrogen gas permeable shell. The shell of the spent solid-state hydride material can be recycled and reused to make new shells.

7 Claims, 5 Drawing Sheets

HYDROGEN PERMEABLE ENCAPSULATED SOLID-STATE HYDRIDE MATERIALS AND METHOD FOR FORMING AND USING SAME

BACKGROUND OF THE INVENTION

This invention relates to the field of solid-state hydride materials, and more particularly to solid-state hydride materials encapsulated in a hydrogen permeable shell and a method for forming and handling same. The thusly formed capsules are useful in applications involved with hydrogen storage and generation, such as military (hydrogen storage for stationary and mobile power sources, remote power, low signature power), aerospace (hydrogen for auxiliary fuel cell power), automotive (hydrogen for fuel cell and combustion engines), commercial (hydrogen for stationary fuel cells for distributed power), and consumer (hydrogen for fuel cell powered portable electronic devices).

Chemical hydrides release hydrogen exothermically which, for thermodynamic reasons, means that they cannot be rehydrogenated (i.e., refueled or recycled) simply by supplying hydrogen to the dehydrogenated material. Therefore, the spent hydride usually must be removed from the point-of-use and transported to a reprocessing facility. Recovering, transporting, and returning these chemical hydride materials can be difficult. Chemical hydrides based on hydrolysis reactions (i.e., reaction with water) are typically formulated as liquids or slurries and therefore, are relatively easily handled by standard pumping techniques. However, chemical hydrides based on solid-state hydride/hydroxide reactions are formulated as dry powders, which make handling difficult. In addition, controlling the hydrogen release reaction of bulk powders that release hydrogen exothermically is also difficult. Many nominally reversible metal hydrides may also benefit from being removed from their point-of-use and reprocessed, i.e., rehydrogenated, at a dedicated reprocessing facility. As an example, $LiAlH_4$, $Li_3AlH_6$, and $AlH_3$ all require excessively high hydrogen pressures for rehydrogenation.

Therefore, it would be advantageous to have a practical form factor and method for making the hydrides in a designed form factor so that the spent (dehydrogenated) products of these hydrides can be practically removed from their point-of-use and then reprocessed at a reprocessing facility.

SUMMARY OF THE INVENTION

The invention provides a practical form factor that comprises solid-state hydride materials in a hydrogen gas permeable shell that allows for easy handling and reprocessing of the hydride materials, and a method for handling and controlling the reaction of solid-state hydride materials by encapsulating aliquots of the hydrides within shells to form capsules that are permeable to hydrogen gas.

The invention enables handling and reaction control of solid state hydride materials that are difficult to handle, e.g., as dry powders, in particular, chemical hydrides based on hydride/hydroxide reactions and nominally reversible hydrides that require excessively high pressures for rehydrogenation. In addition to handling issues, the control of a large bulk of powder that generates hydrogen in an exothermic and therefore self-sustaining process is difficult. The present invention overcomes these difficulties by enabling the capsules to be controllably delivered (or flowed) through a reaction zone and/or easily moved to and from to a storage/hydrogen extraction tank. The rate of flow, the size and shape of the capsules, the nature of the encapsulation material, and the reaction zone and/or storage/hydrogen extraction tank conditions can be used to determine the rate of hydrogen release.

In an encapsulated form factor, solid-state hydrides can be handled relatively easily and handled and moved like a collection of a large number of ball bearings, pills, or other discrete units. This form factor facilitates transport and loading into, and recovery from storage tanks, i.e., in stationary or mobile applications. The hydrogen release reaction can be controlled by moving or flowing the encapsulated material through a reaction zone and/or a storage/hydrogen extraction tank. Because the capsules are permeable to hydrogen, the hydrogen is released without breaking the capsules, which enables the spent material to be handled relatively easily as well. A variety of materials can be used for the shell material, including but not limited to appropriate porous materials, such as porous α-alumina, porous synthetic silica membranes, perforated (e.g., by laser) metal capsules, microporous network polymers, vitreous silica glass membranes, crystalline zeolites, templated ceramics, and microporous expanded poly(tetrafluoroethylene) materials.

Some functions of the encapsulating shell include: (1) allowing control over the hydrogen release reaction; (2) allowing easier handling of the hydride material; (3) allowing safe handling of the hydride material; and (4) allowing straightforward handling of the spent material. Turning to the first consideration of allowing control over the hydrogen release reaction, the hydrogen release reaction can be controlled by flowing encapsulated materials through a reaction zone and/or a delivering the capsules to storage/hydrogen extraction tank where hydrogen gas is extracted from the capsules. The rate of flow and the reaction zone and/or storage/hydrogen extraction tank conditions can be used to determine the rate of hydrogen release. Without the encapsulation, it would not be feasible to flow the hydride powder through a reaction zone in a controlled fashion. Regarding the second consideration of allowing easier handling of the hydride material in an encapsulated form, solid-state hydrides can be handled relatively easily and flowed like a collection of a large number of discrete items, like ball bearings or pills. This form factor facilitates transport and loading into and recovery from storage tanks. By sizing the capsules at the appropriate size to accommodate surface to volume considerations, gas dispersion rates, and the like, a highly efficient form factor is provided. Addressing the third factor of allowing safer handling of the hydride material, it is well known that hydrides are typically very reactive toward air and water. If a storage tank of the hydride powder were to be ruptured, such unencapsulated fuel could come in direct contact with air and water leading to a hazardous reaction. By properly controlling the pore size of the capsules and/or making the outside surface of the capsules hydrophobic, the encapsulated hydrides can be designed to react relatively slowly if accidentally released, yet not interfere with normal operation. Lastly, regarding the fourth consideration of allowing easier handling of the spent material, because the capsules are permeable to hydrogen, the hydrogen can be released without breaking the capsules. This enables the spent, yet still encapsulated material, also to be handled relatively easily and removed from the system. This not only makes "refueling" easier and faster, but will make dispensing of the encapsulated fuel easier to measure (e.g., by volume and/or weight of the capsules), easier to deliver and store, and easier to handle at all points of the chain of load unspent fuel into a fuel tank, and when applicable, moving it to a reaction zone where the hydrogen gas is extracted, moving the spent capsules out of the reaction zone and into a spent capsule location, removing the spent capsules from the spend capsule location, moving the spent capsules in bulk to a reprocessing facility where the spent capsules are reprocessed.

DETAILED DESCRIPTION OF THE INVENTION

Figure 1:
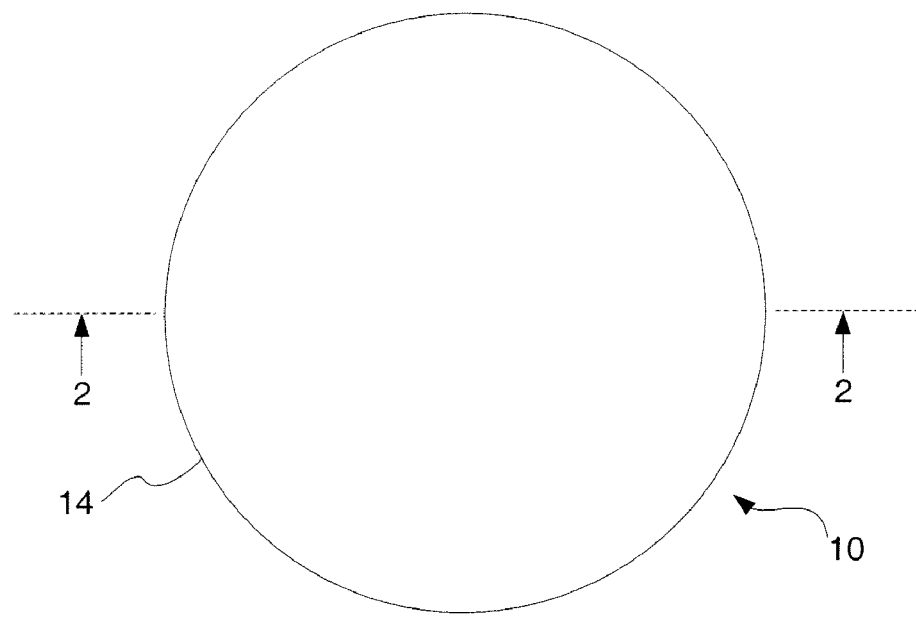
FIG. 1 is a plan view of an exemplary generally spherical shaped capsule form factor of solid-state hydride materials in a hydrogen gas permeable shell.
Figure 2:
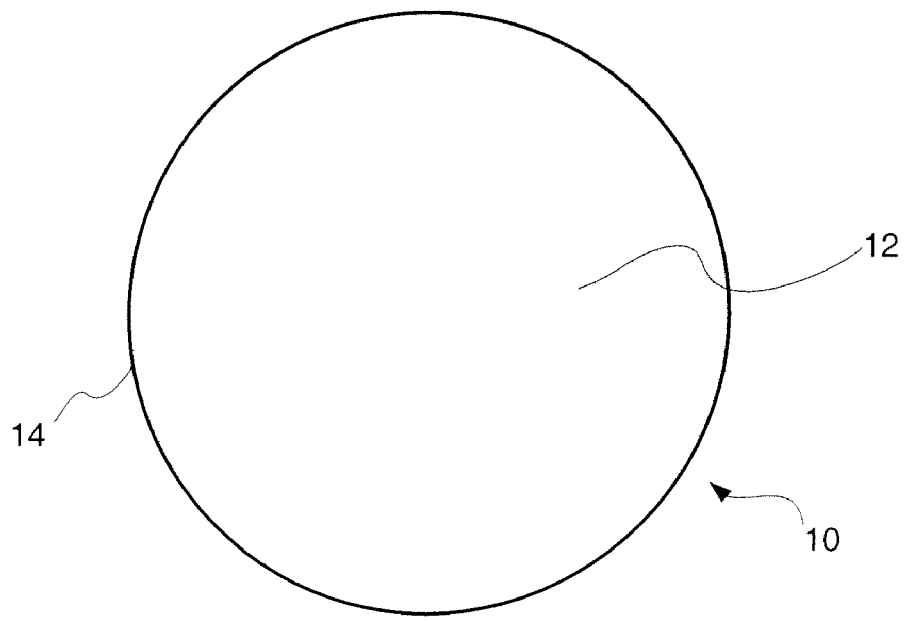
FIG. 2 is a cross-sectional view of the generally spherical capsule of FIG. 1 along view lines 2-2.
Figure 3:
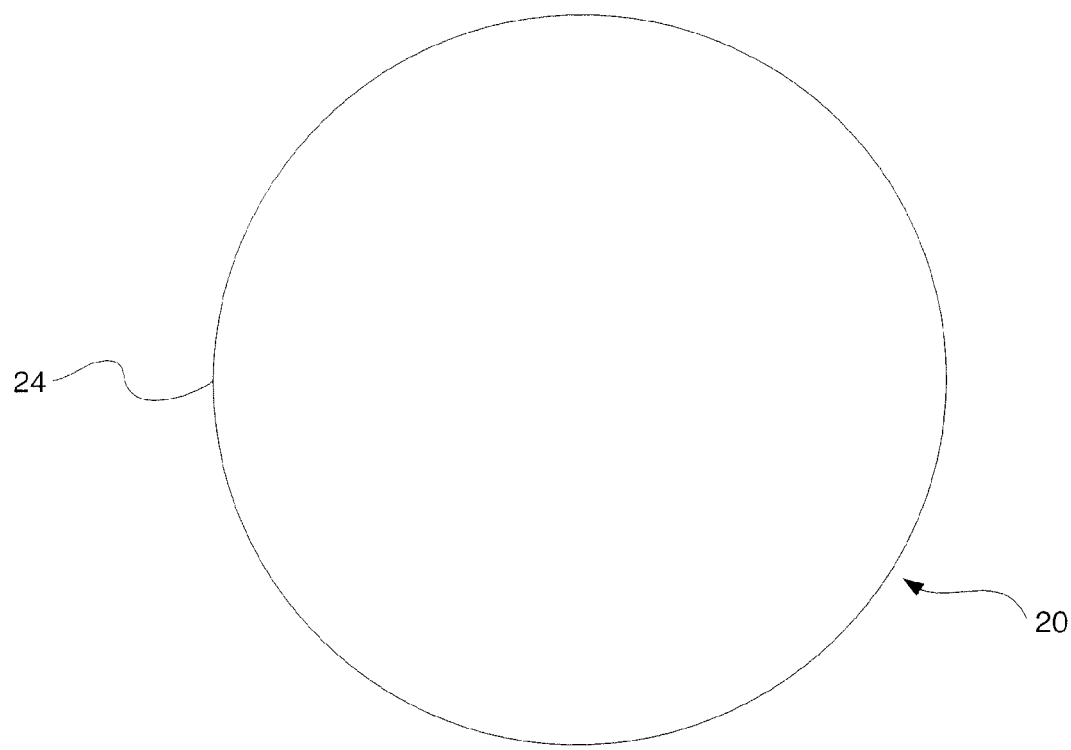
FIG. 3 is a top plan view of an exemplary generally oblate spheroid capsule form factor of solid-state hydride materials in a hydrogen gas permeable shell.
Figure 4:
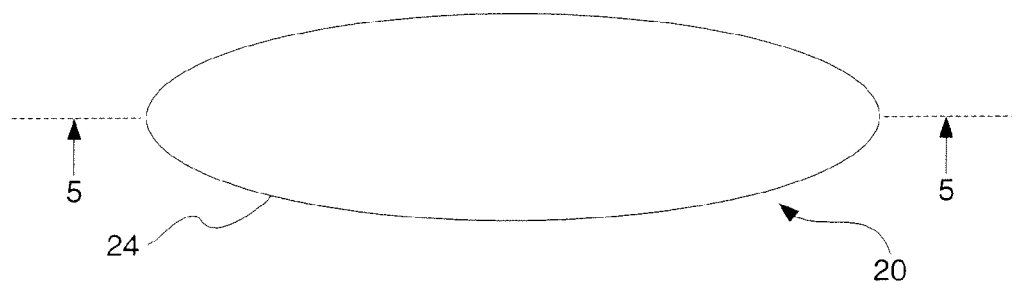
FIG. 4 is a side view of the exemplary generally oblate spheroid-shaped capsule of FIG. 3.
Figure 5:
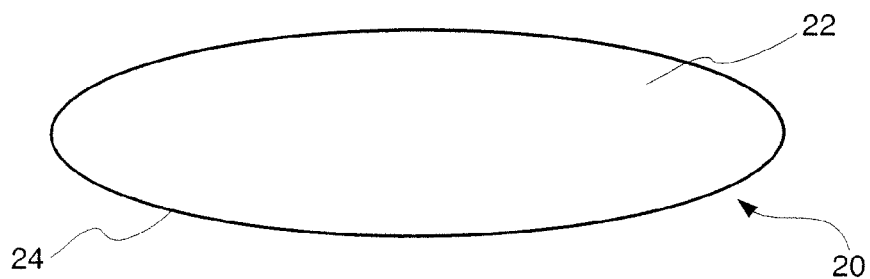
FIG. 5 is a cross-sectional view of the generally spherical capsule of FIG. 4 along view lines 5-5.

As shown in FIGS. 1 and 2, one possible shape of the capsules 10 is generally spherical. A spherical shape or even polyhedral shape will minimize the weight of the capsule relative to the weight of hydride material enclosed, and it is also likely to optimize the flow characteristics. However, other shapes are possible, such as ovoid or flattened shapes. Notably, a flattened capsule, oblate spheroid (e.g., generally M&M® shaped) such as shown in FIGS. 3-5, will reduce diffusion distances within the capsule. In FIG. 3, a top plan view of an exemplary generally oblate spheroid capsule form factor 20 is shown and has a hydrogen gas permeable shell 24. FIG. 4 is a side view of the exemplary generally oblate spheroid-shaped capsule 20 of FIG. 3, and FIG. 5 is a cross-sectional view of the generally spherical capsule of FIG. 4 along view lines 5-5 and shows the contained solid-state hydride material 22 contained in the shell 24.

The size of the capsules can range (in diameter) from millimeter to centimeter, depending on the optimal dimension for the particular applications. Factors that need to be considered when determining capsule size include the flow and the hydrogen release reaction characteristics of different sized capsules. For example, if the capsules are heated in a reaction zone to the proper hydrogen release reaction temperature by conduction from hot hydrogen gas, then smaller capsules will heat faster. In addition, hydrogen produced at the center of a capsule must diffuse through the hydride material to reach the capsule shell and be released. Thus, the capsule size may be limited by the diffusion of hydrogen through the hydride material.

In addition to the above described shapes, polyhedral shapes, such as geodesic dome shaped shells, hexagonal dome shapes, etc. are also possible.

Turning again to FIG. 1 there is shown plan view of an exemplary generally spherical capsule form factor 10 of solid-state hydride materials in a hydrogen gas permeable shell 14. FIG. 2 is a cross-sectional view of the generally spherical capsule of FIG. 1 along view lines 2-2, and shows the solid-state hydride materials 12 in a hydrogen gas permeable shell 14. The shell 14 can be composed of polymers, thermoplastics, ceramics, metals, or other inorganic or organic materials or composites. The solid-state hydride materials 12 can comprise any solid-state hydrides, including but not limited to $LiAlH_4$, $Li_3AlH_6$, and $AlH_3$. Permeability to hydrogen is achieved through diffusion and/or transport mechanisms. The shell 14 requires pores (not shown) that are between about 1 nm to about 150 μm in diameter. The pore sizes need only be sufficiently small to prevent the dry powder hydride mixture from being lost from the capsule during handling or dehydrogenation.

The shell material must withstand handling and the hydrogen release reaction, which occurs at elevated temperatures, without breaking or chemical degradation. Hydrogen release could involve shrinkage or expansion of the hydride material. In the case of expansion, the shell material must be able to withstand the mechanical forces generated. Another option is to account for expansion by adjusting the initial filling of the capsules.

In addition, the shell should be lightweight, meaning as low density and as thin as possible. The weight of the shell needs to be minimized in order to minimize the reduction in gravimetric hydrogen density that is incurred by encapsulation. For example, if a polymeric spherical shell with an outside diameter of 5.2 millimeters, an inside diameter of 5.0 millimeters, and a density of 1.2 g/cm$^3$ encapsulates a dry powder hydride with a powder density of 1.5 g/cm$^3$, then the weight of the shell is $9.87 \times 10^{-3}$ g and the weight of the encapsulated powder is 0.098 g.

Thus, the capsules would have a gravimetric hydrogen density approximately 10% (=$9.87 \times 10^{-3}$/0.098*100%) lower than the un-encapsulated hydride mixture. If the capacity of the pure chemical hydride mixture were 10 weight percent hydrogen, then the capacity of the capsules would be only 9 weight percent.

Examples of suitable porous materials include the following: (1) Commercially available porous α-alumina (available from the NOK Corp. of Tokyo, Japan) with an average pore size of about 150 nm. Also commercially available is alumina several microns thick with a multi-layered structure consisting of a coarse α-alumina base coated with finer layers of α-alumina and a top layer of γ-alumina with an average pore size of 5 nm. (2) Synthetic silica membranes with pores ~2 nm, which can be prepared by chemical vapor deposition of a thin silica layer on a porous glass or alumina support using the thermal decomposition of tetraethylorthosilicate, such as disclosed by R. M. de Vos and H. Verweij, Science 1998, 279, 1710-1711; S. Morooka, S. S. Kim, S Yan, K. Kasakabe, and M. Watanabe, Int. J. Hydrogen Energy, 1996, 21, 183-188.) (3) Laser-perforated metal capsules, with pores from 50 nm to 100 micron in diameter, such as disclosed by E. Mateo, R. Lahoz, G. F. de la Fuente, A. Paniagua, J. Coronas, J. Santamaria, Chem. Mater. 2004, 16(24), 4847-4850). (4) Microporous network polymers, synthesized from the dioxane-forming reaction between hydroxylated aromatic monomers and halogenated aromatic (usually porphyrin-based) monomers. These materials contain pores in the range of several nanometers in diameter, and they are easily processed by casting from solution to give robust, self-standing structures as disclosed by P. M. Budd, S. M. Makhseed, B. S. Ghanem, K. J. Msayib, C. E. Tattershall, and N. B. McKeown, Materials Today 2004, 40-46). (5) Vitreous silica glass membranes 20 to 30 nm thick with pores sized at about ~3 nm, obtained by chemical vapor deposition (CVD). (6) Microporous crystalline zeolites (aluminosilicates) and related microporous solids (e.g., metal-organic frameworks) with interconnected pores from about 1 to about 10 nm in dimension. (7) Nanometer to micrometer sized pores also can be formed in many well-known ways through self-assembly and templating followed by template removal. For example, sol-gel based ceramic shells can be formed with organic molecule templates that can subsequently be oxidized leaving behind nanometer-sized pores. Likewise, templating with polymer beads yields micrometer-sized pores. Lastly, (8) Microporous expanded poly(tetrafluoroethylene) membranes and woven fibers, such as GoreTex® and Tyvek® materials, with pores on the order of about 30 nm to about 20 μm.

An ideal embodiment that accommodates all these conditions is a 5 mm diameter shell composed of an expanded poly(tetrafluoroethylene) membrane on a woven poly(tetrafluoroethylene-coated fiberglass support (commercially available from W.L. Gore & Associates, Inc.) This material exhibits an air permeability of 3.8 $m^3/min/m^2$ @ 20 mm wg (a 1.5 ton pressure difference). Given that the surface area of a 5 mm diameter sphere is $7.9 \times 10^{-5}$ $m^2$, the gas flux through the shell is $5 \times 10^{-6}$ $m^3/s$ (notably, the flux for hydrogen likely will be even higher than that for air). Furthermore, given that the volume inside a 5 mm diameter capsule is $6.5 \times 10^{-8}$ $m^3$, and the powder inside has a density of $1.5 \times 10^6$ $g/m^3$ and a mass of about 0.1 g, and assuming that the powder generates 10 wt % hydrogen, a total of $1.1 \times 10^{-4}$ $m^3$ of hydrogen is produced. Thus, at a pressure difference of only 1.5 torr, the amount of hydrogen generated in one capsule will take approximately 20 seconds to pass through the shell and be released for use. This amount of time is quite practical, and in fact, the pressure difference between the interior and the exterior of the shell could easily be ten times larger. In addition, the shell material is stable at a continuous service temperature of 260 C, is structurally robust, and is easily manufactured.

The capsules can be formed and sealed by any known method. They can be melt-sealed closed, crimped closed, or formed in two parts that mechanically fit together.

The capsules can be handled or flowed by any known methods designed for granular or course media. This would include pumps, conveyor belts, and gravity feeds.

To release the hydrogen from the hydride mixture contained in the capsules, capsules can be delivered from a capsule storage tank, or "fuel tank", to a reaction zone. The reaction zone is maintained at a temperature sufficient to initiate and maintain the hydrogen release reaction within each capsule and thereafter maintain the desired temperature within the capsule. This temperature could vary from approximately 50° C. to 300° C. Upon start-up, the reaction zone will have to be heated by a reserve power source. After initiation of the reaction, the exothermic reaction heat coupled with active cooling, if necessary, will maintain the reaction zone temperature. If the hydrogen generating reaction is endothermic, heat can be supplied from the fuel cell or an auxiliary power source. The capsule shell material must be able to withstand the hydrogen release reaction temperature. The exact temperature depends on the formulation of the hydride and the application. Depending on the design of the reaction zone, feeding the capsules into the reaction zone could be continuous or batch mode. The rate of hydrogen release is controlled by the reaction zone temperature, the feed rate, and the residence time of the capsules in the reaction zone. Depending on the chemistry of the solid-state hydride, initiation of the hydrogen release reaction and/or start-up could be accomplished by other schemes such as direct microwave heating of the chemical hydride. The hydrogen gas released is delivered to the fuel cell or other power-generating device. In lieu of delivering the capsules from a capsule fuel tank to a reaction zone where hydrogen gas is extracted, a device to extract the hydrogen gas from the capsule can be incorporated with the fuel tank. As a non-limiting example, a heat source, such as a 3-D grid of spaced apart heatable wires located in the fuel tank that selectably heat certain sections of the fuel tank and capsules located in the heated sections can be used to heat the solid-state hydride material in the capsules to extract hydrogen gas, which hydrogen gas can then be piped out of the fuel tank and delivered to where needed. An advantage of this device is that once the capsules are delivered to the fuel tank, the capsules do not need to be moved again to extract the hydrogen gas.

Figure 6:
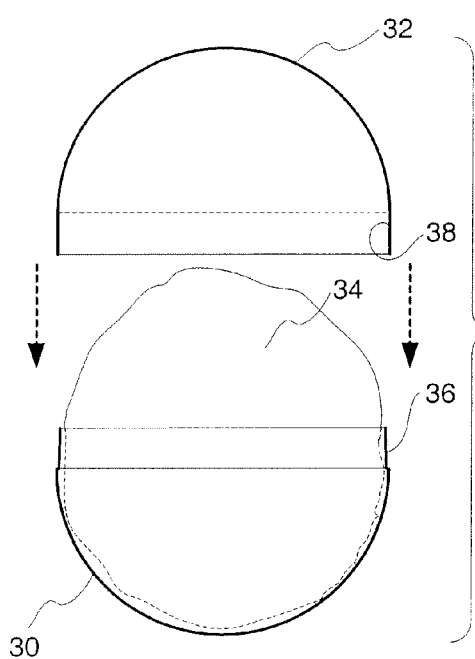
FIG. 6 is a front exploded view showing two generally hemi-spherical hydrogen gas permeable shells, one loaded with solid-state hydride material, prior to be assembled.
Figure 7:
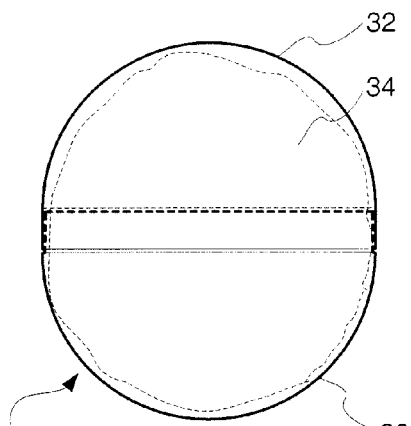
FIG. 7 is a front view showing the two generally hemi-spherical hydrogen gas permeable shells of FIG. 7 after being brought together to enclose the solid-state hydride material.

FIG. 6 is a front exploded view showing two generally hemi-spherical hydrogen gas permeable shells 30 and 32, with one shell 30 loaded with solid-state hydride material 34, prior to be assembled. The shells 30 and 32 can have connectable sleeve regions 36 and 38, respectively, which when brought together, as shown in FIG. 7, establish a friction fit to hold the two shells together with the solid-state hydride material 34. For example, the sleeve region 36 can be sized and shaped to slide inside and tightly fit with an inside diameter of the sleeve region 38 of the shell 32. Thus brought together, the two shells 30 and 32 form the completed generally cylindrical form factor 40. If desired, the two shells can be adhered, welded together, or further coated to prevent the two shells from inadvertently separating. The shells 30 and 32 can be formed of the same materials as described above with respect to the embodiment of FIGS. 1 and 2. Other methods and ways of joining the two shells can be used.

Figure 8:
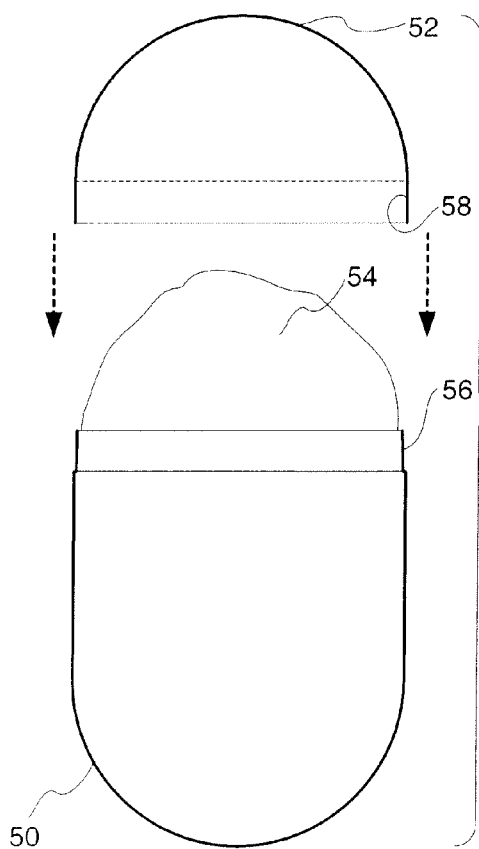
FIG. 8 is a front exploded view showing two hydrogen gas permeable shells, one being generally cylindrical with a hemispherical bottom, loaded with solid-state hydride material, and a generally hemispherical top, prior to be assembled.
Figure 9:
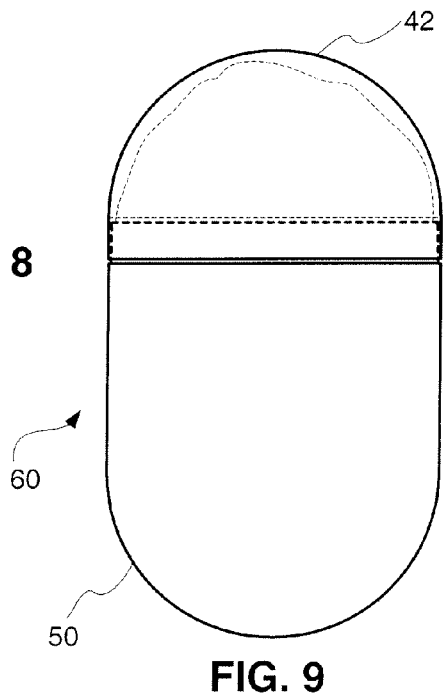
FIG. 9 is a front view showing the two generally hydrogen gas permeable shells of FIG. 8 after being brought together to enclose the solid-state hydride material.

FIG. 8 is a front exploded view showing two hydrogen gas permeable shells 50 and 52, with the first shell 50 being generally cylindrical with a hemispherical bottom. This first shell 50 can be loaded with solid-state hydride material 54 prior to assembly. The shells 50 and 52 can have connectable sleeve regions 56 and 58, respectively, which when brought together, as shown in FIG. 9, establish a friction fit to hold the hold the two shells together with the solid-state hydride material 54 contained therein. For example, the sleeve region 56 can be sized and shaped to slide inside and tightly fit with an inside diameter of the sleeve region 58 of the shell 52. Thus brought together, the two shells 50 and 52 form the completed generally cylindrical form factor 60. If desired, the two shells can be adhered, welded together, or further coated to prevent the two shells from inadvertently separating. The shells 50 and 52 can be formed of the same materials as described above with respect to the embodiment of FIGS. 1 and 2. Other methods and ways of joining the two shells can be used.

With respect to the embodiments shown in FIGS. 6-9, the shells 30 and 32, and 50 and 52, used to form the completed form factors 40 and 60, respectively, can be filled with the solid-state hydride material in a similar manner that capsules are filed with, for example, powder nutritional supplement or pharmaceutical agents. There are well-established method, techniques and technologies for fast and economical loading of capsules. Such technologies can be applied to the loading of the inventive form factors.

In addition to being formed as two part shells, the capsules can be melt-sealed closed, or crimp closed.

With regards to the capsules described in FIGS. 1-9 and other possible capsule shapes, while the entire capsule can be formed from hydrogen gas permeable material, it is also possible to form the capsule with selective portions being hydrogen gas permeable.

Figure 10:
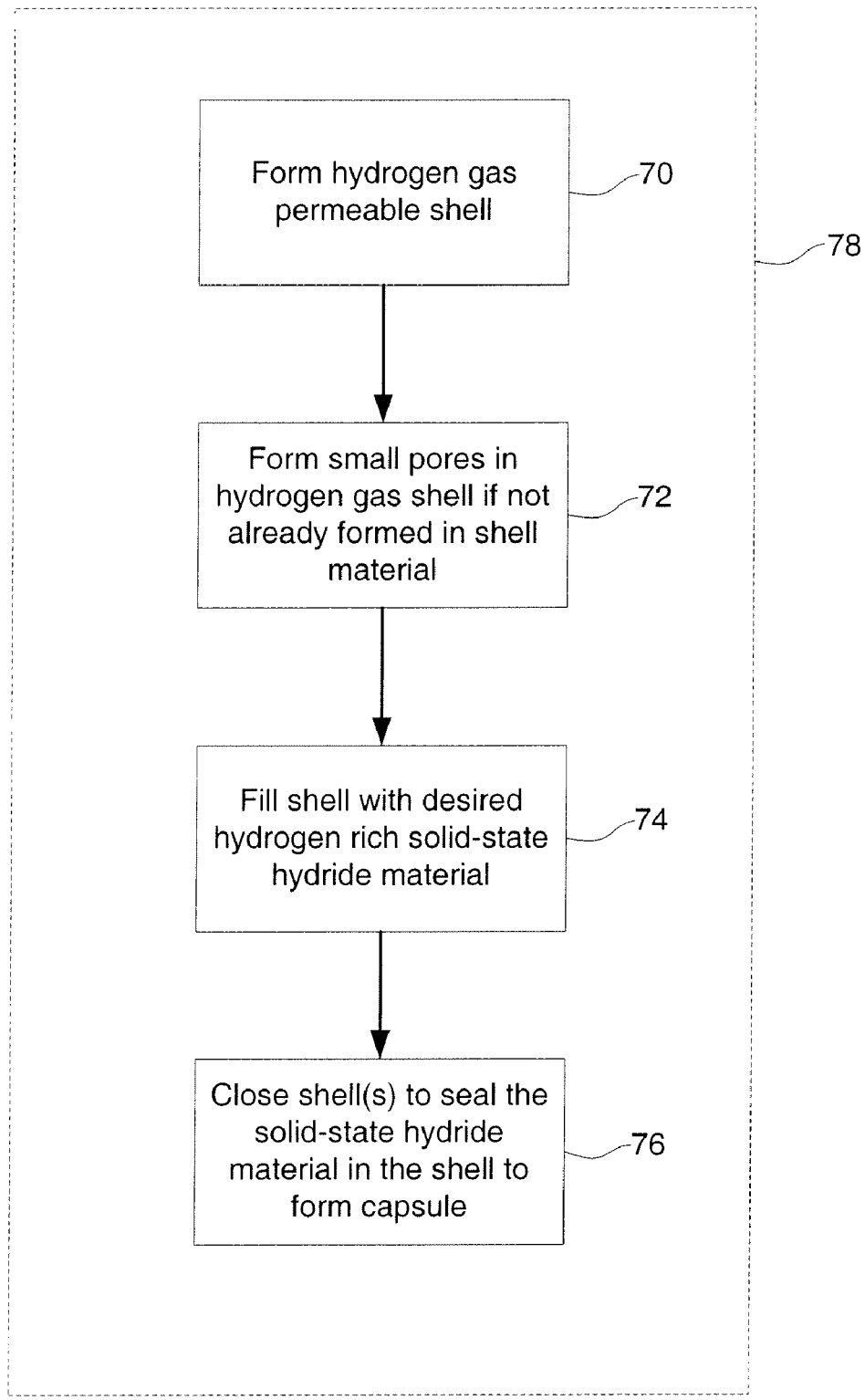
FIG. 10 is a flowchart of an exemplary method of producing solid-state hydride materials in a hydrogen gas permeable shell.

FIG. 10 is a flowchart of an exemplary method of producing solid-state hydride materials in a hydrogen gas permeable shell. In this exemplary method of producing solid-state hydride materials in a hydrogen gas permeable shell, appropriate shells are formed in a first step 70. This formation can be by known techniques depending on the materials used, such as injection molding, blow molding, casting, vapor deposition, and stamping, to name some possibilities. As may be required, small pores can be formed in the material, e.g., by using lasers, etc., in an optional step 72. Next, the shell component(s) are filled with the desired solid-state hydride material in a step 74, and in a fourth step 76, the shell component(s) are closed together to seal the solid-state hydride material inside the thusly formed hydrogen gas permeable capsule. As may be required, the capsule components can be fit together by friction alone, by adhesives, or welding can be used. The filled capsules can also be coated with another hydrogen gas permeable coating to retain the capsule components together. The steps 70-76 comprise the forming steps 78 of forming the capsules.

Figure 11:
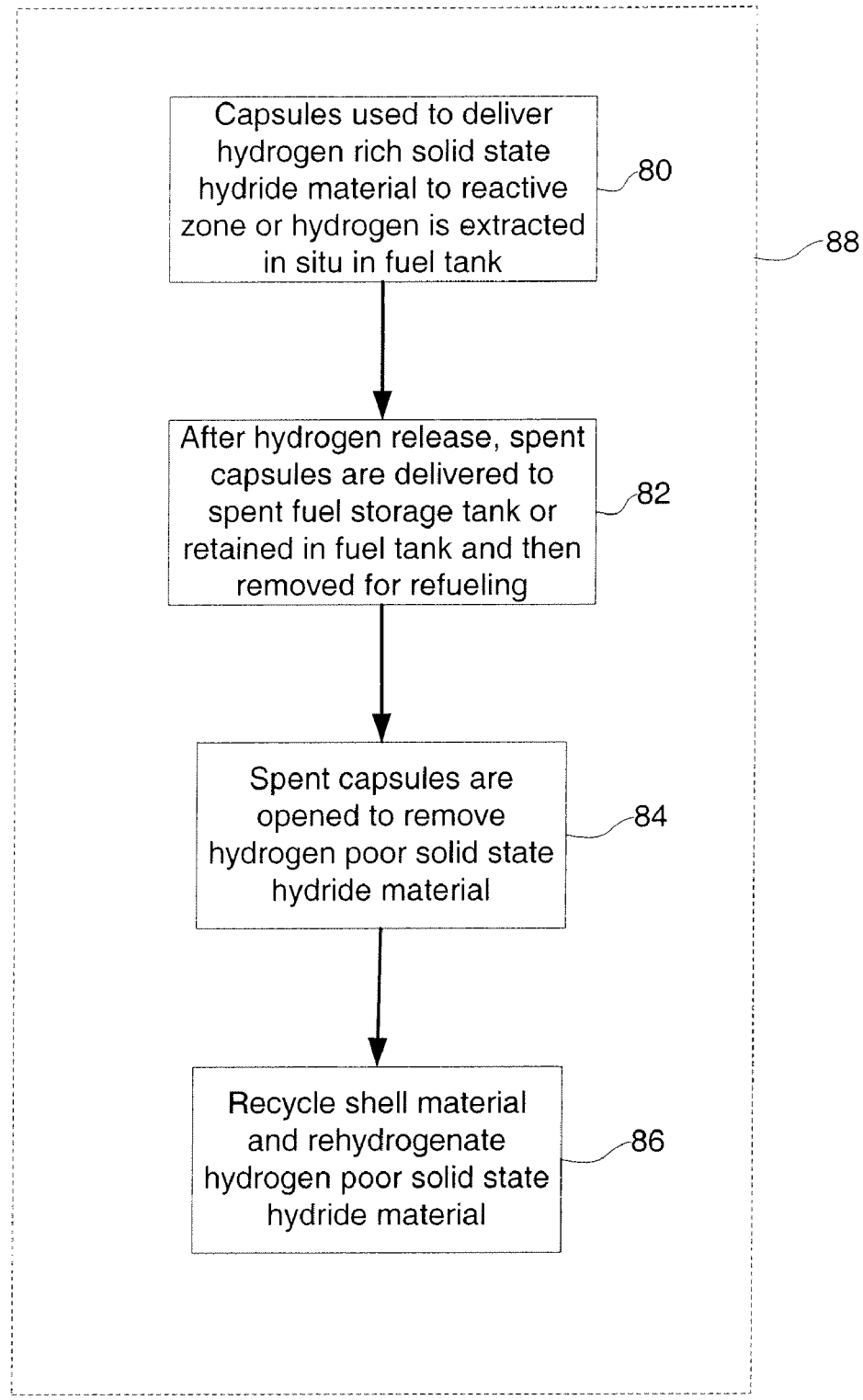
FIG. 11 is a flowchart of an exemplary method of using capsules of solid-state hydride materials in a hydrogen gas permeable shell and recycling same.

FIG. 11 is a flowchart of an exemplary method of using capsules of solid-state hydride materials in a hydrogen gas permeable shell and recycling same. After being produced, the capsule can then be used to conveniently deliver the hydrogen rich solid-state hydride material to a hydrogen extraction or reactive zone in step 80. After hydrogen release, the spent (i.e., dehydrogenated) capsules are delivered to a spent fuel storage tank in step 82, where they are removed during refueling. As noted above, in lieu of delivering the capsules from a capsule fuel tank to a reaction zone where hydrogen gas is extracted, a device to extract the hydrogen gas from the capsule can be incorporated in or combined with the fuel tank. As a non-limiting example, a heat source, such as a 3-D grid of spaced apart heatable wires located in the fuel tank that selectably heat certain sections of the fuel tank and capsules located in the heated sections can be used to heat the solid-state hydride material in the capsules to extract hydrogen gas, which hydrogen gas can then be piped out of the fuel tank. Some advantage of this embodiment include the fact that once the capsules are delivered to the fuel tank, the capsules do not need to be moved to a separate extraction zone where hydrogen gas is extracted. Furthermore, this embodiment allows a single tank to be used as not separate spent fuel tank is needed.

Because the capsules do not break during hydrogen release, handling the spent capsules is accomplished by the same means as the hydrogenated capsules. Upon return to a reprocessing facility, in step 84 the spent capsules are opened, e.g., by crushing, shredding, dissolving or otherwise separating or opening the shell halves, and the spent hydride material is removed from the capsule and separated from the capsule shell material. The hydride material is then recycled. Similarly, the capsule shell material can be reprocessed and used to encapsulate rehydrogenated hydride material in step 86. The thusly removed spent solid-state hydride material is then reprocessed to be rehydrogenated, and then repacked in the desired hydrogen gas permeable shell for use once more, as described in the forming steps 80. The steps 80-86 comprise the using and recycling steps 88 of the capsules.

Another advantage of the current invention is made apparent in the encapsulating of the reversible hydride materials. Unlike exothermic (chemical) hydrides, reversible hydrides generate hydrogen endothermically. The reverse, rehydrogenation, reaction is, therefore, exothermic and can be accomplished by supplying hydrogen to the dehydrogenated material. However, with current materials the reverse reaction rate is too slow which makes refueling times too long, much greater than the desired 5 minutes. Moreover, if refueling times can be shortened to about 5 minutes, then the exothermic heat flux, which needs to be dissipated in order to keep the hydride material at the desired refueling temperature, becomes prohibitively large. Estimates are in the range of 250 kW during an approximately 5 minute refueling time. One way to avoid these issues is to remove the hydride material from a vehicle and perform the rehydrogenation at the refueling station or some other central facility. As with the hydrides described above, reversible hydride materials are formulated as dry powders which are difficult to handle. Encapsulation with hydrogen permeable shells can facilitate handling and permit unloading of spent fuel and reloading of rehydrogenated capsules. Rehydrogenation can be performed relatively slowly in a larger facility (compared to the scale of an individual vehicle) equipped for the required heat dissipation.

Thus, the invention provides a convenient method and form factor of solid-state hydride material for use in hydrogen using devices and processes.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention.

What is claimed is:

1. A capsule having a hydrogen gas permeable shell with solid-state hydride material encapsulated therein, comprising:
    a hydrogen gas permeable shell having a shape selected from the group consisting of generally spherical, generally cylindrical with hemispherical ends, and oblate spheroid; and
    solid-state hydride material placed in the hydrogen gas permeable shell, wherein the capsule is flowable.

2. The capsule of claim 1, wherein the hydrogen gas permeable shell comprises at least two connected shell sections.

3. The capsule of claim 2, wherein the at least two hydrogen gas permeable shell sections are at least one of frictionally connected, adhered together, or welded together.

4. The capsule of claim 1, wherein the hydrogen gas permeable shell comprises a material selected from the group consisting of porous α-alumina, coarse α-alumina base coated with finer layers of α-alumina and a top layer of γ-alumina, porous synthetic silica membranes, perforated metal, microporous network polymers, vitreous silica glass membranes, microporous crystalline zeolites, microporous metal-organic frameworks with interconnected pores, templated ceramics, microporous expanded poly(tetrafluoroethylene) material, and combinations thereof.

5. The capsule of claim 1, wherein the hydrogen gas permeable shell has pores that are between about 1 nm to about 150 μm in diameter.

6. The capsule of claim 1, wherein the solid-state hydride material is hydrogen rich material selected from the group consisting of $LiAlH_4$, $Li_3AlH_6$, $AlH_3$, and combinations thereof.

7. A capsule having a hydrogen gas permeable shell with solid-state hydride material encapsulated therein, comprising:
 a hydrogen gas permeable shell comprising a material selected from the group consisting of porous α-alumina, coarse α-alumina base coated with finer layers of α-alumina and a top layer of γ-alumina, porous synthetic silica membranes, perforated metal, vitreous silica glass membranes, microporous crystalline zeolites, microporous metal-organic frameworks with interconnected pores, templated ceramics, and combinations thereof; and
 solid-state hydride material placed in the hydrogen gas permeable shell.

* * * * *